United States Patent
Humer et al.

(10) Patent No.: US 7,455,357 B2
(45) Date of Patent: Nov. 25, 2008

(54) ACTIVE HEAD RESTRAINT SYSTEM FOR A VEHICLE SEAT

(75) Inventors: Mladen Humer, West Bloomfield, MI (US); Gerald S. Locke, Lake Orion, MI (US); Arjun V. Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 78 days.

(21) Appl. No.: 11/538,485

(22) Filed: Oct. 4, 2006

(65) Prior Publication Data

US 2008/0084098 A1 Apr. 10, 2008

(51) Int. Cl.
*B60N 2/42* (2006.01)
(52) U.S. Cl. .............. 297/216.12; 297/408; 297/409
(58) Field of Classification Search ............ 297/216.12, 297/391, 403, 406, 408, 409
See application file for complete search history.

(56) References Cited

U.S. PATENT DOCUMENTS

| | | | |
|---|---|---|---|
| 4,222,608 A | 9/1980 | Maeda | |
| 4,671,573 A | 6/1987 | Nemoto et al. | |
| 5,052,754 A | 10/1991 | Chinomi | |
| 5,071,190 A | 12/1991 | Tame | |
| 5,681,079 A | 10/1997 | Robinson | |
| 5,927,804 A | 7/1999 | Cuevas | |
| 6,019,424 A * | 2/2000 | Ruckert et al. | 297/216.12 |
| 6,074,011 A | 6/2000 | Ptak et al. | |
| 6,179,379 B1 * | 1/2001 | Andersson | 297/216.13 |
| 6,192,565 B1 | 2/2001 | Tame | |
| 6,199,947 B1 * | 3/2001 | Wiklund | 297/216.12 |
| 6,447,068 B1 | 9/2002 | Anderson et al. | |
| 6,573,673 B1 | 6/2003 | Hampel et al. | |
| 6,631,956 B2 | 10/2003 | Mauro et al. | |
| 6,719,368 B1 * | 4/2004 | Neale | 297/216.14 |
| 6,749,256 B1 * | 6/2004 | Klier et al. | 297/216.12 |
| 6,789,845 B2 * | 9/2004 | Farquhar et al. | 297/216.12 |
| 6,871,913 B2 * | 3/2005 | Malsch et al. | 297/410 |
| 6,880,891 B2 | 4/2005 | Yetukuri et al. | |
| 6,899,395 B2 | 5/2005 | Yetukuri et al. | |
| 6,955,397 B1 | 10/2005 | Humer | |
| 6,983,989 B1 | 1/2006 | Veine et al. | |
| 6,983,996 B2 | 1/2006 | Svantesson | |
| 6,991,287 B1 * | 1/2006 | Ogawa et al. | 297/216.12 |
| 7,044,544 B2 * | 5/2006 | Humer et al. | 297/216.12 |
| 7,097,242 B2 | 8/2006 | Farquhar et al. | |
| 7,204,552 B2 * | 4/2007 | Ishizuka | 297/216.12 |
| 7,237,838 B2 * | 7/2007 | Hoffmeister et al. | 297/216.12 |
| 7,284,794 B2 * | 10/2007 | Yamaguchi et al. | 297/216.12 |
| 7,325,869 B2 * | 2/2008 | Braune | 297/216.12 |
| 2003/0001414 A1 | 1/2003 | Humer et al. | |
| 2003/0011224 A1 * | 1/2003 | Humer et al. | 297/216.12 |
| 2003/0015897 A1 | 1/2003 | Humer et al. | |
| 2004/0119324 A1 * | 6/2004 | Humer et al. | 297/216.12 |
| 2005/0156456 A1 | 7/2005 | Robinson et al. | |

(Continued)

*Primary Examiner*—Laurie K Cranmer
(74) *Attorney, Agent, or Firm*—Brooks Kushman P.C.

(57) ABSTRACT

A vehicle seat is disclosed with a seatback frame for supporting the back of an occupant. A head restraint extends from the seatback frame for supporting the head of the occupant. In one embodiment, a four-bar mechanism is operably connected to the seatback frame and the head restraint for receiving an input force from the occupant in response to an impact condition, and for consequently actuating the head restraint to an actuated position. In another embodiment, the four-bar mechanism locks the head restraint in the actuated position in response to an input force of the occupant resting against the seatback.

20 Claims, 3 Drawing Sheets

U.S. PATENT DOCUMENTS

2006/0071517 A1 4/2006 Humer et al.
2006/0071518 A1 4/2006 Hippel et al.
2006/0103189 A1 5/2006 Humer et al.

* cited by examiner

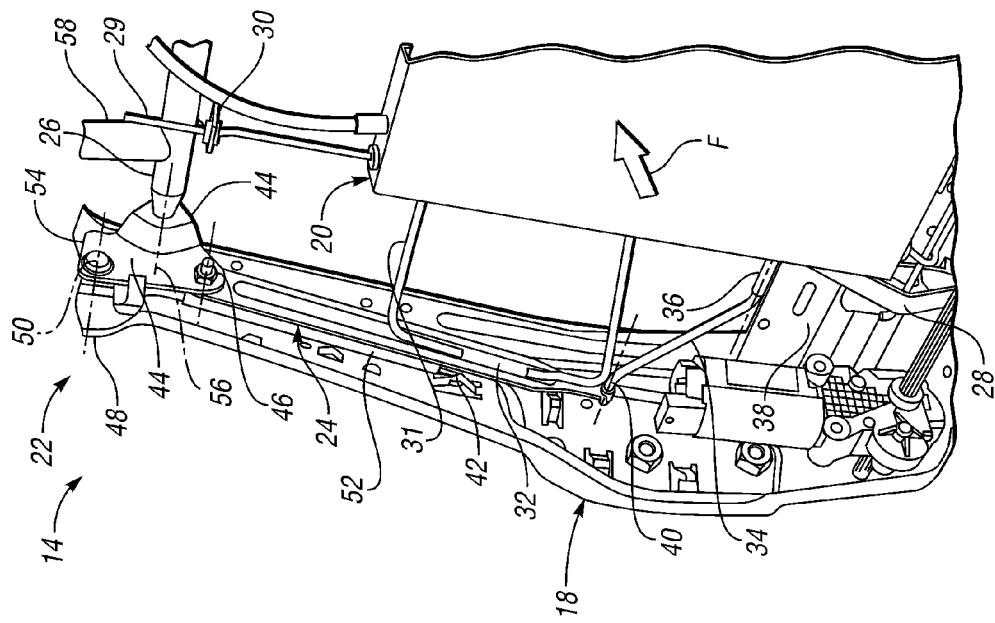
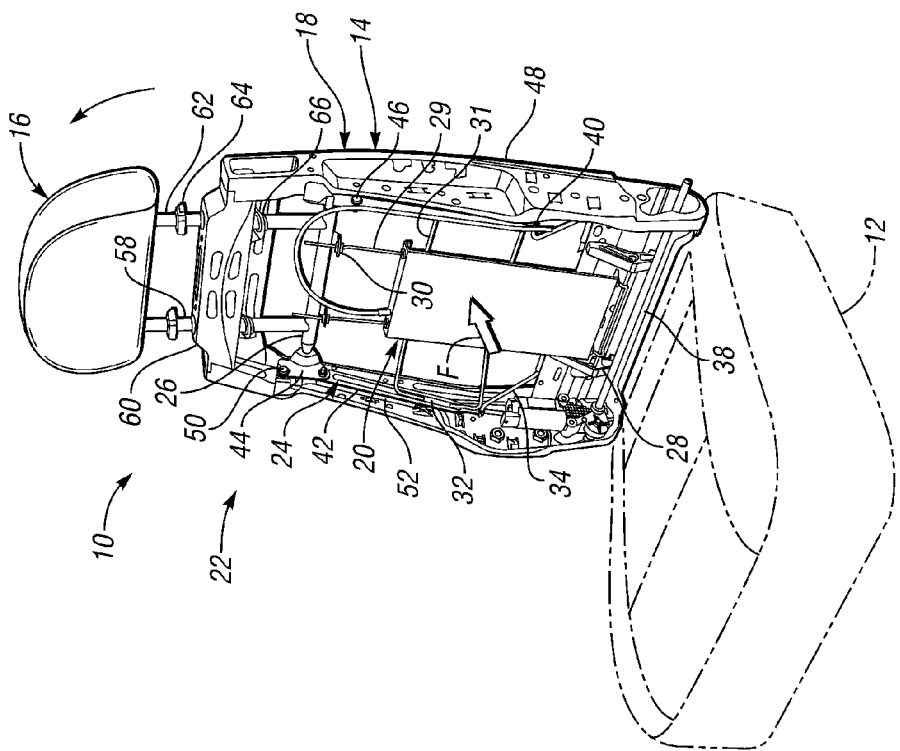

ACTIVE HEAD RESTRAINT SYSTEM FOR A VEHICLE SEAT

BACKGROUND OF THE INVENTION

1. Field of the Invention

The invention relates to active head restraints for vehicle seats.

2. Background Art

Vehicle seats are provided with translatable head restraints for translating to an impact position in response to a force imparted to the seat by an occupant during an impact condition. One example of a vehicle seat having a movable head restraint is disclosed in U.S. Patent Application No. 2004/0119324 A1, which published on Jun. 24, 2004.

BRIEF DESCRIPTION OF THE DRAWINGS

FIG. 1 is a perspective view of a vehicle seat in accordance with the present invention;

FIG. 3 is an enlarged perspective view of a portion of the vehicle seat of FIG. 1;

DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 2:
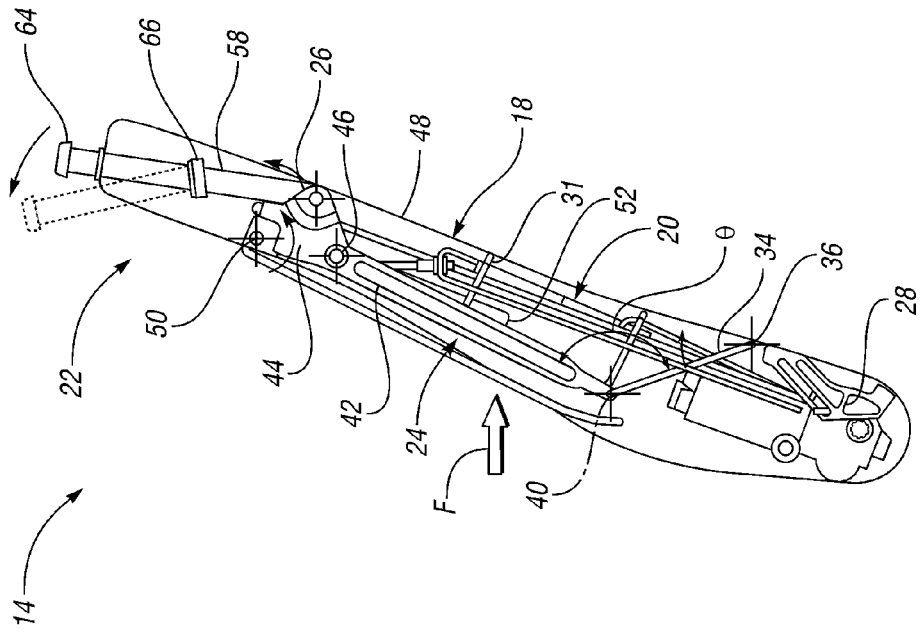
FIG. 2 is a front elevation view of the vehicle seat in FIG. 1.

With reference now to FIGS. 1 and 2, a vehicle seat is illustrated in accordance with the present invention and is referenced generally by numeral 10. The vehicle seat includes a seat bottom 12 secured to a floor of the associated vehicle for seating an occupant upon the seat bottom 12. A seatback 14 extends from the seat bottom 12 and is secured relative to the seat bottom 12 for supporting the back of the occupant against the seatback 14. The seat 10 also includes a head restraint 16 extending above the seatback 14 for supporting the head of the occupant against the head restraint 16.

In one embodiment, the seatback 14, which is illustrated with a cover and padding removed for depicting internal components, includes a frame 18 for providing the structural support for the seatback 14. The seatback 14 may include an adjustable lumbar support mechanism 20 for providing lumbar support to the occupant, while providing adjustability so that the occupant can select a desired level of comfort and support. The lumbar mechanism 20 may be an input for an active head restraint system 22. For example, the lumbar mechanism 20 may be connected to an actuatable mechanism, such as a linkage 24. Upon receipt of an impact to the lumbar mechanism 20, such as a body of the occupant that exceeds a predetermined force, the lumbar mechanism 20 may actuate the linkage 24. The output of the linkage 24 may be the head restraint 16, such as that the head restraint 16 is translated forward and upward relative to the seatback 14, as illustrated by an arcuate arrow in FIG. 1. In another embodiment, the back of the occupant is supported by a static suspension wire that is mounted to the linkage 24.

The output of the linkage 24 may include an armature 26 that extends transversely across the frame 18. The armature 26 is connected to the linkage 24 for translation relative to the frame 18. In one embodiment, the head restraint 16 is supported by the armature 26 and actuated by the armature 26.

The lumbar mechanism 20 is mounted to the frame 18 by a pair of ramps 28 and the linkage 24. The lower end of the lumbar mechanism 20 is connected to the ramps 28 to pivot relative to the ramps 28 and to slide generally upward and rearward relative to seatback 14. An upper end of the lumbar mechanism 20 is mounted to the linkage 24. A pair of upright wires 29 extend from the lumbar mechanism 20 and are each received within a bracket 30 extending from the armature 26. The lumbar mechanism of the present embodiment also includes a wire frame 31 which is mounted at input points 32 upon the linkage 24. The input points 32 may be welded or otherwise suitably fastened. The lumbar mechanism 20 can also be adjusted in a fore-aft direction relative to the frame 18 for comfort of the occupant. In one embodiment, the wire frame 31 is a static suspension wire 31 for supporting the back of the occupant without fore-aft lumbar adjustment.

Figure 4:
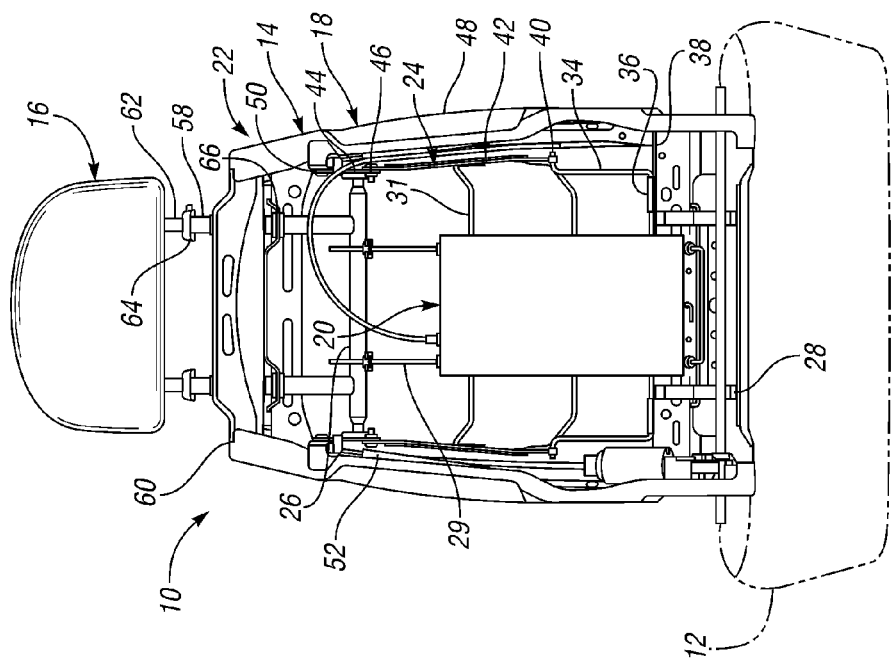
FIG. 4 is a fragmentary side elevation view of a portion of the vehicle seat of FIG. 1.

With reference now to FIGS. 1-4, the linkage 24 is described in further detail. The linkage 24 may be a four-bar mechanism, such as a four-bar link mechanism as illustrated in the embodiment of FIGS. 1-4. The linkage 24 includes a lower link 34, which is pivotally connected to the frame 18 by a pair of bearings 36 that are formed upon a lower crossbar 38 of the frame 18. As illustrated in FIGS. 3 and 4, the bearings 36 are oriented generally rearward relative to the frame 18. Alternatively, the bearings 36 may be formed upon the ramps 28.

The lower link 34 may be a cold-formed metal component, such as a metal wire or rod, a stamping, a molded or cast component, or any suitably manufactured component. To provide the lower link 34 at both lateral sides of the linkage 24 within the frame 18, the lower link 34 may be formed integrally to extend across both lateral sides of the linkage 24, thereby interconnecting both lateral sides of the linkage 24 for uniform actuation across the linkage 24. The lower link 34 may terminate at its distal ends with lateral extensions 40 that each provide a pivotal connection with a coupler link 42 at each lateral side of the linkage 24.

The coupler links 42 extend upward within the seat frame 18. In one embodiment, the lumbar mechanism 20 is mounted to the input points 32, which are secured to the coupler links 42. Thus, the lumbar mechanism 20 is mounted to the linkage 24 through the coupler links 42. The coupler links 42 may be formed from any suitable manufacturing method, such as a cold-forming operation, including, stamped steel.

An upper end of each coupler link 42 is pivotally connected to an upper link 44 at pivotal connection 46. The pivotal connection 46 may be provided by a fastener, such as a bolt and nut. The upper links 44 are each pivotally connected to an upper region of side supports 48 of the frame 18. The pivotal connection 50 of the upper links 44 may be provided by a fastener, such as a bolt, a rivet or the like. The upper links 44 may also be formed from a cold-forming operation, such as stamping steel, or any suitable manufacturing method.

As will be discussed in detail further, the links 34, 42, 44 and the frame 18 collectively provide a four-bar mechanism, such as a four-bar linkage 24 for actuation of the active head restraint mechanism 22.

For the embodiment illustrated, an extension spring 52 is connected at one end to an intermediate region of the corresponding side support 48. An upper end of the extension spring 52 extends through an aperture 54 in the upper link 44 as illustrated in FIG. 3, which is offset from the pivotal connection 50 for urging the linkage 24 to a design position, which is illustrated in FIGS. 1-4.

The armature 26 extends laterally across the frame 18 and is pivotally connected with both upper links 44 for pivoting about an axis 56 (FIG. 3), which is offset by a link provided linearly between the pivotal connection 46 of the upper link 44 and the coupler link 42, and the pivotal connection 50 provided by the upper link 44 and the frame 18. The armature 26 interconnects both lateral sides of the linkage 24 for uniform actuation.

A pair of receptacles 58 extend vertically upward from the armature 26 and extend through an upper crossbar 60 of the frame 18. The receptacles 58 receive a pair of rods 62 therein, which support the head restraint 16 above the seatback 14. The receptacles 58 may include a locking mechanism 64 for permitting height adjustment of the head restraint 16 relative to the seatback 14. The head restraint rods 62 each cooperate with the upper crossbar 60 for linear translation relative to the upper crossbar 60 and to pivot about the armature axis 56 relative to the upper crossbar 60.

During an impact condition, the seatback 14 may receive a force of the occupant against the seatback 14. The head restraint mechanism 22 actuates the head restraint 16 from the design position to an actuated position to orient the head restraint 16 higher relative to the seatback 14 and closer to the head of the occupant in order to reduce injury to the occupant. The input force to the head restraint mechanism 22 is illustrated by the arrow F in FIGS. 1 and 4. This force F may be generated, for example, when the vehicle impacts another object thereby accelerating the seat 10 into the occupant. Such an impact condition may be generated from an impact, such as a rear impact. Likewise, the impact condition may be generated from a forward impact wherein the occupant rebounds from a seat harness or other mechanism, into the seat. If the force F of the occupant exceeds a predetermined force to overcome the bias of the extension spring 52, then the active head restraint mechanism 22 actuates.

Figure 5:
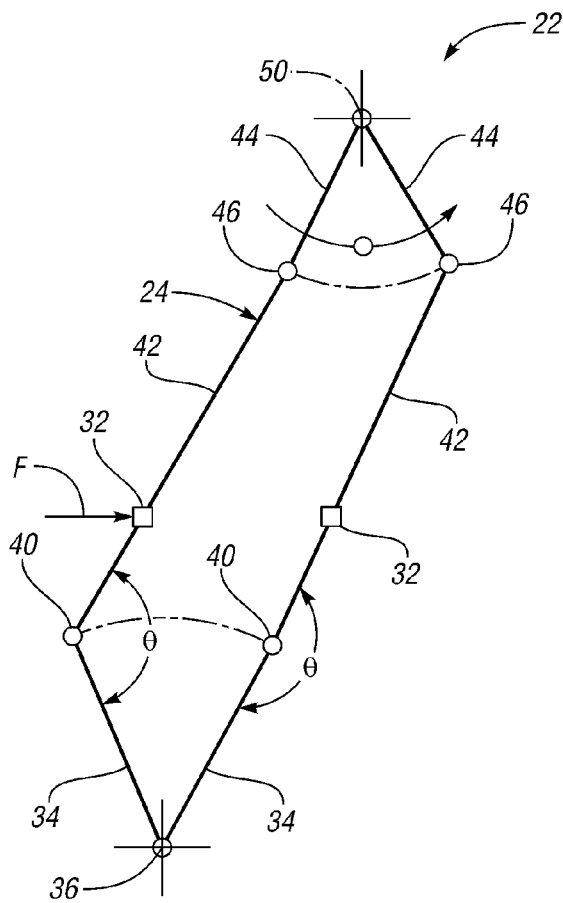
FIG. 5 is a schematic of an active head restraint system of the vehicle seat of FIG. 1.

Referring now to FIGS. 4 and 5, the linkage 24 is illustrated in side elevation view in FIG. 4, and is also illustrated schematically in FIG. 5. As the force F is transferred from the lumbar mechanism 20 or static suspension wire to the coupler link 42, the coupler link 42 is urged in a rearward direction of the seatback 14. This translation of the coupler link causes the lower link 34 to pivot above the bearings 36 to translate rotationally in a clockwise direction as indicated by the clockwise arrow in FIG. 4; and is illustrated in FIG. 5 as the lower link 34 translates from the design position on the left to the actuated position on the right. The coupler link 42 is connected to the lower link 34 by the pivotal connection at the lower link lateral ends 40 thereby creating an included angle θ therebetween. The included angle θ is approximately 165 degrees at the actuated position, in one example.

As the coupler link 42 is translated rearward relative to the seatback 14, the coupler link 42 also rotationally translates the upper link 44 due to the pivotal connection 46. The upper link 44 pivots about the pivotal connection 50 with the frame 18 to thereby pivot counterclockwise as illustrated by the arrows in FIGS. 4 and 5. Thus, as the coupler link 42 translates rearward to the actuated position illustrated on the right side of FIG. 5, the upper link 44 is driven to an actuated position as well, which is illustrated on the right side of FIG. 5.

With reference specifically to FIG. 4, as the upper link 44 pivots about the pivotal connection 50, the armature 26 is also driven about the pivotal connection 50 such that the armature 26 is driven rearward relative to the seatback 14 and upward. As the armature 26 is driven, the armature 26 pivots about the armature axis 56 such that the receptacles 58 translate upward relative to the upper crossbar 60 of the frame 18. The upper crossbar 60 also includes a pair of guides 66 each displaced about one of the receptacles 58 for guiding the translation of the receptacle 58. The guides 66 act as fulcrums, so that as the armature 26 is driven rearward in FIG. 4, the distal ends of the receptacles 58 pivot counterclockwise as illustrated by the upward arcuate arrow in FIG. 4. Thus, the linkage 24 drives the head restraint 16 upward and forward in response to an impact condition.

Referring again to FIG. 5, as the coupler link is actuated to the right, the included angle θ between the coupler link 42 and the lower link diverges until the coupler link 42 and the lower link 34 are generally parallel. At the actuated position, the linkage 24 provides a geometric interrelationship which requires minimal input force to maintain the head restraint 16 in the impact condition. For example, the coupler link 42 and the lower link 34 are near an inline or self-locking position, wherein the force from the return extension spring 52 is distributed through the link 44, 42, 34 to the frame 18 instead of to the lumbar mechanism 20. Thus, the linkage 24 is temporarily locked in the actuated position without requiring an additional locking mechanism. Thus, the active head restraint mechanism 22 provides a temporary locking mechanism thereby reducing a quantity of components, costs of the components and an overall mass of the vehicle seat 10.

Figure 6:
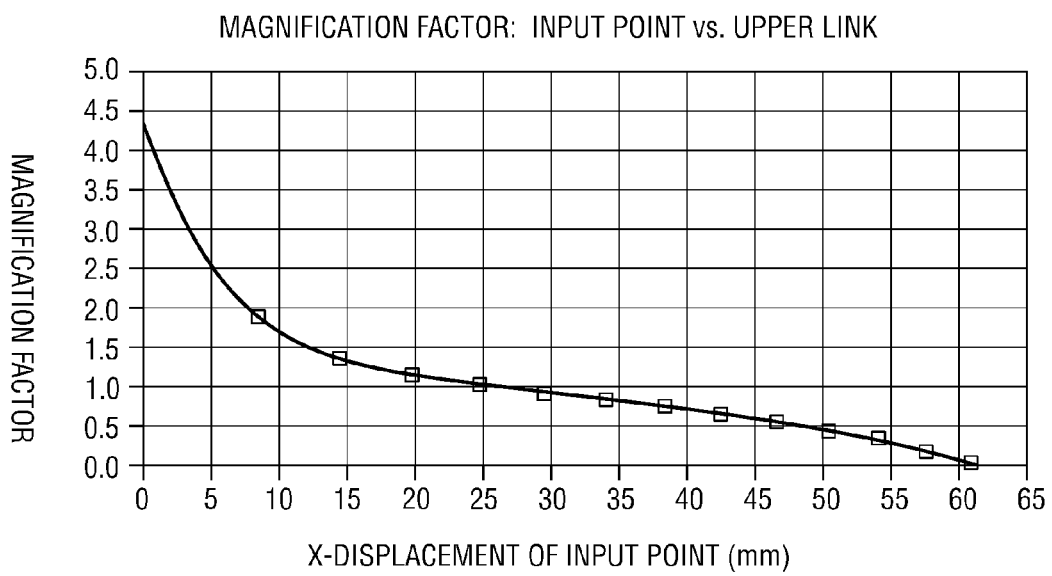
FIG. 6 is a graph of input displacement versus magnification factor of an input point to an output point of an active head restraint mechanism.

FIG. 6 illustrates a chart of a magnification factor of the input point 32 of the force F versus the upper link 44. The abscissa of the graph illustrates a horizontal displacement of the input point 32 of the force F, which is measured in millimeters. The ordinate illustrates a magnification factor of displacement upon the upper link 44. The value of zero millimeters of displacement of the input point 32 represents a design position of the linkage 24. A maximum displacement, which is indicated generally at sixty-one millimeters indicates the actuated position of the linkage 24.

As illustrated by the graph, initial displacement of the coupler link 42 at input point 32 results in a large magnification translation to the upper link 44 and consequently to the head restraint 16. This large magnification factor coincides with an initial receipt of the input force F. As the coupler link 42 continues to translate, the magnification factor approaches one at approximately twenty-six millimeters of displacement of the input point 32. As the input point 32 continues to translate past twenty-six millimeters, the magnification factor drops below one, thereby reducing the magnification of translation of the input point 32 relative to the upper link 44. Thus, for example, the range of magnification factor begins greater than four at the design position, approaches one at an intermediate stage of translation, and subsequently drops below one, and approaches zero at the actuated position. In another non-limiting embodiment of the invention the magnification factor at the design position is between one and four; for example, the magnification factor at the design position may be two. These factors and translation dimensions are offered as exemplary embodiments of the invention, and are not to be interpreted as limiting. Various magnification factors and translations are contemplated within the spirit and scope of the invention, which may be selected for various design criteria.

Thus, at the actuated position of the linkage 24, a large translation of the input point 32 results in only a small translation of the head restraint 16. Likewise, a large mechanical advantage is provided such that minimal force applied to the input point 32 at the actuated position maintains the head restraint 16 in the actuated position. This mechanical advantage orients the head restraint 16 at the actuated position as a result of actuation of the linkage 24 and further maintains the head restraint 16 at the actuated position with the minimal force, such as the back of the occupant resting against the lumbar mechanism 20 after the impact to temporarily lock the head restraint 16 in the actuated position.

As the occupant removes the force from the lumbar mechanism 20, for example, by rebounding from the seat 10 after impact, thereby removing the occupant's back from contact with the seatback 14, the extension spring 52 returns the linkage 24 to the design position. Thus, the linkage 24 is reset and therefore would require another input force of an impact condition magnitude in order to actuate the linkage 24.

The invention contemplates various force input points to generate the desired translation and magnification factors during various ranges of the translation. For example, the linkage 24 of the embodiment of FIGS. 1-4 initially receives the input force F at input points 32 and at the armature brackets 30. At the initial translation of the lumbar mechanism 20 by the input force F, the lumbar mechanism 20 slides up the ramps 28 and distributes the input force F to the input points 32 and to the armature brackets 30. The distribution of the input force F to the armature 26 assists in overcoming the initial magnification factor for actuating the linkage 24. As the linkage 24 continues to translate and the magnification factor is reduced, as illustrated in FIG. 6, the input force F is primarily distributed to the input points 32, due to the sliding engagement of the upright wires 29 in the armature brackets 30. Thus the magnification factor versus displacement relationship may be tailored to the desired result by varying the distribution of input force F during various ranges of the graph (FIG. 6).

Alternatively, the magnification factor at the design position may be further enhanced by the addition of a suspension wire at the input points 32. The suspension wire may require a large amount of force to deflect and consequently actuate the linkage 24 depending on the input force design criteria for a given seating application.

In summary, a vehicle seat 10 is provided with an active head restraint mechanism 22 that optimizes the receipt of an input force to translate the head restraint 16 abruptly into the actuated position, and subsequently maintain the head restraint 16 in the actuated position. The active head restraint mechanism 22 also returns to the design position upon removal of the back of the occupant from the seatback 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a seatback frame for supporting a back of an occupant;
   a head restraint extending from the seatback frame for supporting a head of the occupant;
   a linkage operably connected to the seatback frame to collectively provide a four-bar mechanism, the linkage being operably connected to the head restraint for receiving an input force from the occupant in response to an impact condition, for consequently actuating the head restraint to an actuated position; and
   a biasing member cooperating with the four-bar mechanism for maintaining the head restraint in a design position in absence of an impact condition;
   wherein the four-bar mechanism provides a mechanical advantage to overcome the biasing member and maintain the head restraint in the actuated position with an input force less than that provided during the impact condition without an additional locking mechanism.

2. The vehicle seat of claim 1 wherein the four-bar mechanism provides a magnification factor of input displacement to an output displacement of the head restraint that is greater than two prior to an impact condition, and less than one-half after the head restraint is translated to the actuated position.

3. The vehicle seat of claim 1 wherein the four-bar mechanism provides a magnification factor of input displacement to an output displacement of the head restraint that is greater than four prior to an impact condition, and less than one-half after the head restraint is translated to the actuated position.

4. The vehicle seat of claim 1 further comprising a lumbar mechanism mounted to the four-bar mechanism for receiving the input force from the occupant for actuating the four-bar mechanism.

5. The vehicle seat of claim 1 wherein the head restraint is pivotally and slidably connected to the seatback frame.

6. The vehicle seat of claim 1 wherein the four-bar mechanism further comprises:
   a first link pivotally connected to the seatback frame;
   a second link pivotally connected to the first link; and
   a third link pivotally connected to the second link and the seatback frame, the third link being operably connected to the head restraint.

7. The vehicle seat of claim 6 wherein one of the first link and second link cooperates with the vehicle seat for receiving the input force from the occupant for actuating the first, second and third links, and for consequently actuating the head restraint to the actuated position.

8. The vehicle seat of claim 6 wherein the head restraint is mounted to the third link.

9. The vehicle seat of claim 6 wherein the head restraint is pivotally connected to the third link.

10. The vehicle seat of claim 6 wherein the head restraint is mounted to an armature that is pivotally connected to the third link and cooperates with the seatback frame to pivot relative to the seatback frame and translate relative to the seatback frame.

11. The vehicle seat of claim 6 wherein the biasing member further comprises an extension spring cooperating with the seatback frame and the third link for maintaining the head restraint in the design position in absence of an impact condition.

12. The vehicle seat of claim 6 wherein the input force is imparted upon the second link.

13. The vehicle seat of claim 6 wherein the input force is imparted upon the second link and the third link.

14. The vehicle seat of claim 6 wherein the first and second links approach an inline orientation in the actuated position to distribute a return force from the biasing member to the frame so that the head restraint is maintained in the actuated position with an input force less than that provided during the impact condition.

15. The vehicle seat of claim 14 wherein the biasing member is connected to the seatback frame and the third link so that the return force is directed to the inline orientation of the first and second links in the actuated position.

16. The vehicle seat of claim 14 farther comprising a lumbar mechanism mounted to the second link for receiving the input force from the occupant for actuating the four-bar mechanism.

17. The vehicle seat of claim 6 wherein the seatback frame further comprises a pair of spaced apart crossbars connected to a pair of spaced apart side members; and
wherein the first link and the third link are each pivotally connected to one of the side members.

18. A vehicle seat comprising:
a seatback frame for supporting a back of an occupant;
a head restraint extending from the seatback frame for supporting a head of the occupant;
a first link pivotally connected to the seatback frame;
a second link pivotally connected to the first link;
a third link pivotally connected to the second link and the seatback frame, the third link being operably connected to the head restraint; and
a biasing member cooperating with one of the first, second and third links for maintaining the head restraint in a design position in absence of an impact condition;
wherein one of the first link and second link cooperates with the vehicle seat for receiving an input force from the occupant in response to an impact condition for actuating the first, second and third links, for consequently actuating the head restraint to an actuated position; and
wherein the first and second links approach an inline orientation in the actuated position to distribute a return force from the biasing member to the frame so that the head restraint is maintained in the actuated position with an input force less than that provided during the impact condition.

19. The vehicle seat of claim 18 wherein the first second and third links collectively provide a mechanical advantage to overcome the biasing member and maintain the head restraint in the actuated position with an input force less than that provided during the impact condition without an additional locking mechanism.

20. A vehicle seat comprising:
a seatback frame for supporting a back of an occupant;
a head restraint extending from the seatback frame for supporting a head of the occupant;
a first link pivotally connected to the seatback frame;
a second link pivotally connected to the first link;
a third link pivotally connected to the second link and the seatback frame, the third link being operably connected to the head restraint;
an extension spring cooperating with the seatback frame and the third link for maintaining the head restraint in an unloaded position; and
a lumbar mechanism mounted to the second link for receiving an input force from the occupant in response to an impact condition for actuating the first, second and third links for consequently actuating the head restraint to an actuated position;
wherein the links cooperate to provide a magnification factor of input displacement to an output displacement of the head restraint that is greater than four prior to an impact condition, and less than one-half after the head restraint is translated to the actuated position.

* * * * *

UNITED STATES PATENT AND TRADEMARK OFFICE
CERTIFICATE OF CORRECTION

PATENT NO. : 7,455,357 B2 Page 1 of 1
APPLICATION NO. : 11/538485
DATED : November 25, 2008
INVENTOR(S) : Mladen Humer, Gerald S. Locke and Arjun V. Yetukuri It is certified that error appears in the above-identified patent and that said Letters Patent is hereby corrected as shown below:

Column 7, Line 5, Claim 16:

Delete "farther" and insert -- further --.

Signed and Sealed this

Seventeenth Day of February, 2009

JOHN DOLL
*Acting Director of the United States Patent and Trademark Office*